US009354648B2

(12) United States Patent
Yajima et al.

(10) Patent No.: US 9,354,648 B2
(45) Date of Patent: May 31, 2016

(54) CONSTANT-VOLTAGE CIRCUIT

(71) Applicant: PANASONIC CORPORATION, Osaka (JP)

(72) Inventors: Hiroshi Yajima, Osaka (JP); Hideyuki Kihara, Kanagawa (JP); Takahiro Uehara, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 316 days.

(21) Appl. No.: 14/197,045

(22) Filed: Mar. 4, 2014

(65) Prior Publication Data

US 2014/0184182 A1 Jul. 3, 2014

Related U.S. Application Data

(63) Continuation of application No. PCT/JP2012/001639, filed on Mar. 9, 2012.

(30) Foreign Application Priority Data

Sep. 27, 2011 (JP) ................................. 2011-210913

(51) Int. Cl.
*G05F 1/569* (2006.01)
*G05F 1/571* (2006.01)
(Continued)

(52) U.S. Cl.
CPC ................ *G05F 1/573* (2013.01); *G05F 1/575* (2013.01)

(58) Field of Classification Search
CPC ............... G05F 1/10; G05F 1/46; G05F 1/56; G05F 1/561; G05F 1/562; G05F 1/565; G05F 1/569; G05F 1/573; G05F 1/575; G05F 1/5735; H02M 1/32; H02M 3/156; H02M 3/1563; H02H 3/08; H02H 3/087; H02H 9/02; H02H 9/025
USPC ......... 323/222-226, 265, 271-278, 280-286, 323/303, 311-317, 351, 908; 363/50, 363/56.03, 56.07, 56.1, 78, 79; 361/18, 361/93.1, 93.7, 93.9; 327/538-543
See application file for complete search history.

(56) References Cited

U.S. PATENT DOCUMENTS 7,315,154 B2 * 1/2008 Sugiura .................. G05F 1/565 323/276
2003/0011952 A1 1/2003 Fukui
(Continued)

FOREIGN PATENT DOCUMENTS

JP 2001-306163 A 11/2001
JP 2003-029856 A 1/2003
(Continued)

OTHER PUBLICATIONS

International Search Report issued in PCT/JP2012/001639, dated May 29, 2012, with English translation.

*Primary Examiner* — Timothy J Dole
*Assistant Examiner* — Carlos Rivera-Perez
(74) *Attorney, Agent, or Firm* — McDermott Will & Emery LLP

(57) ABSTRACT

A constant-voltage circuit having an overcurrent protection circuit which includes: a first sense transistor, one main terminal connected to an input terminal of the constant-voltage circuit and a control terminal connected to a control terminal of an output transistor generates a current corresponding to an output current from the output transistor; a voltage level adjusting circuit configured to generate a voltage corresponding to a voltage of a main terminal of the output transistor at an output terminal side of the constant-voltage circuit by extracting a current that is not affected by a change in the output current from the output transistor, and adjust a voltage of another main terminal of the first sense transistor such that the adjusted voltage becomes equal to the generated voltage; and a protection circuit to control a control voltage applied from an error amplifier to the control terminal of the output transistor.

4 Claims, 9 Drawing Sheets

(51) Int. Cl.

| | |
|---|---|
| ***H02H 7/00*** | (2006.01) |
| ***H02H 9/00*** | (2006.01) |
| ***G05F 1/573*** | (2006.01) |
| ***G05F 1/575*** | (2006.01) |

(56) References Cited

U.S. PATENT DOCUMENTS

2004/0004467 A1 1/2004 Miyanaga et al.
2005/0036246 A1* 2/2005 Nagata .................... G05F 1/573 361/18
2005/0185490 A1 8/2005 Zhang
2006/0043945 A1* 3/2006 Sohn ....................... G05F 1/573 323/273
2008/0180079 A1 7/2008 Kurozo et al.
2008/0265852 A1 10/2008 Imura

FOREIGN PATENT DOCUMENTS

JP 2004-038832 A 2/2004
JP 2005-235932 A 9/2005
JP 2008-052516 A 3/2008
JP 2008-165763 A 7/2008
JP 2008-276477 A 11/2008
JP 4574902 B2 11/2010

* cited by examiner

CONSTANT-VOLTAGE CIRCUIT

This is a continuation application under 35 U.S.C. 111(a) of pending prior International Application No. PCT/JP2012/001639, filed on Mar. 9, 2012.

The disclosure of Japanese Patent Application No. 2011-210913, filed on Sep. 27, 2011, including the specification, drawings and claims is incorporated herein by reference in its entirety.

BACKGROUND OF THE INVENTION

1. Field of the Invention

The present invention relates to constant-voltage circuits.

2. Description of the Related Art

A constant-voltage circuit configured to supply a constant voltage to a load includes an overcurrent protection circuit, which limits a load current value when the load current has exceeded a rated current in order to protect the inside of the circuit and the load. FIG. 7 is a circuit diagram of a conventional constant-voltage circuit including an overcurrent protection circuit disclosed in Japanese Patent No. 4574902.

First, a constant-voltage circuit 100 shown in FIG. 7 is described. The constant-voltage circuit 100 is configured to generate a constant output voltage VOUT based on an input voltage VDD (power supply voltage) applied to an input terminal IN, and output the output voltage VOUT from an output terminal OUT. Specifically, the output voltage VOUT is divided by a voltage divider circuit 150 including resistors R151 and R152. Then, an error amplifier 130 compares a voltage obtained by the voltage division by the voltage divider circuit 150 (the obtained voltage is hereinafter referred to as a “divided voltage”) with a reference voltage from a reference voltage source 120. Based on a result of the comparison, a gate terminal of an output transistor M110 is controlled.

To be more specific, the output transistor M110 shown in FIG. 7 is configured as a PMOS transistor, and its drain terminal is connected to the output terminal OUT and the voltage divider circuit 150. The divided voltage from the voltage divider circuit 150 is applied to a non-inverting input terminal of the error amplifier 130, and the reference voltage from the reference voltage source 120 is applied to an inverting input terminal of the error amplifier 130. If the divided voltage from the voltage divider circuit 150 is lower than the reference voltage from the reference voltage source 120, a gate voltage VG (M110) of the output transistor M110 decreases in accordance with an output signal from the error amplifier 130. As a result, the output voltage VOUT increases. On the other hand, if the divided voltage from the voltage divider circuit 150 is higher than the reference voltage from the reference voltage source 120, the gate voltage VG (M110) of the output transistor M110 increases in accordance with an output signal from the error amplifier 130. As a result, the output voltage VOUT decreases. As described above, the constant-voltage circuit 100 operates in such a manner as to cause the output voltage VOUT outputted from the output terminal OUT to be constant.

Next, an overcurrent protection circuit 40 shown in FIG. 7 is described. The overcurrent protection circuit 40 includes a first sense transistor M130, a second sense transistor M170, a current detection circuit 70, and a protection circuit 80. It should be noted that the first sense transistor M130 and the second sense transistor M170 shown in FIG. 7 are configured as PMOS transistors. A gate terminal of the first sense transistor M130 and a gate terminal of the second sense transistor M170 are connected to the gate terminal of the output transistor M110. A source terminal of the first sense transistor M130 and a source terminal of the second sense transistor M170 are connected to a source terminal of the output transistor M110.

A drain terminal of the first sense transistor M130 and a drain terminal of the second sense transistor M170 are connected to the current detection circuit 70. Owing to an operation of the current detection circuit 70, which will be described below, a drain voltage VD (M130) of the first sense transistor M130 is controlled to be equal to a drain voltage VD (M110) of the output transistor M110. As a result, a drain current corresponding to the ratio between the gate size of the output transistor M110 and the gate size of the first sense transistor M130 flows through the drain terminal of the first sense transistor M130.

The drain current of the first sense transistor M130 is inputted to the protection circuit 80 via the current detection circuit 70. The protection circuit 80 includes transistors M100 and M200 and resistors R100 and R200, and is configured to control a gate-source voltage VGS (M110) of the output transistor M110 in accordance with the value of the drain current of the first sense transistor M130. It should be noted that the transistor M100 and the transistor M200 included in the protection circuit 80 are configured as a PMOS transistor and an NMOS transistor, respectively. The drain current of the first sense transistor M130 is converted into a voltage by flowing through the resistor R200. The converted voltage is applied to a gate terminal of the transistor M200. If a gate-source voltage VGS (M200) of the transistor M200 exceeds a threshold voltage VTH200 of the transistor M200, then the transistor M200 becomes a conductive state and a current flows through the resistor R100, so that a voltage drop at the resistor R100 increases. As a result, the transistor M100 whose gate terminal is connected to one end of the resistor R100 becomes a conductive state, and the gate voltage VG (M110) of the output transistor M110 becomes equal to a source voltage VS (M110). At the time, the gate-source voltage VGS (M110) of the output transistor M110 becomes zero, and the output transistor M110 becomes a non-conductive state. Consequently, the supply of a current to a load (not shown) connected to the output terminal OUT is stopped. Thus, overcurrent protection by the overcurrent protection circuit 40 is performed in the above-described manner.

Next, the current detection circuit 70 shown in FIG. 7 is described. It should be noted that transistors M704, M706, M708, M709, and M710 included in the current detection circuit 70 are configured as a PMOS transistor, an NMOS transistor, a PMOS transistor, an NMOS transistor, and a PMOS transistor, respectively.

First, assume that the gate size of the first sense transistor M130 and the gate size of the second sense transistor M170 are equal to each other. Since the first sense transistor M130 and the second sense transistor M170 are connected to each other at their source terminals and gate terminals, gate-source voltages VGS (M130) and VGS (M170) of the respective first and second sense transistors M130 and M170 are equal to each other. Accordingly, if drain voltages VD (M130) and VD (M170) of the respective first and second sense transistors M130 and M170 are adjusted to be equal to each other, then drain-source voltages VDS (M130) and VDS (M170) of the respective first and second sense transistors M130 and M170 become equal to each other. At the time, a current flowing through the first sense transistor M130 and a current flowing through the second sense transistor M170 have the same current value.

A source terminal of the transistor M708 is connected to the drain terminal of the second sense transistor M170. A drain terminal of the transistor M706 disposed at the input side of a current mirror circuit is connected to a drain terminal of the transistor M708. A drain terminal of the transistor M710 is connected to a drain terminal of the transistor M709 disposed at the output side of the current mirror circuit. Accordingly, a current flowing into the source terminal of the transistor M708 and a current flowing into a source terminal of the transistor M710 have the same current value.

A source terminal of the transistor M704 is connected to the drain terminal of the first sense transistor M130. A gate terminal of the transistor M704 is connected to gate terminals of the respective transistors M710 and M708. Accordingly, a current flowing into the source terminal of the transistor M704 and the current flowing into the source terminal of the transistor M710 have the same current value.

It is understood from the above description that the currents flowing through the respective transistors 704, 708, and 710 are equal to each other. Also, gate-source voltages VGS (M704) and VGS (M710) of the respective transistors M704 and M710 are equal to each other. Here, the source terminal of the transistor M710 is connected to the output terminal OUT, and a source voltage VS (M704) of the transistor M704 is equal to the output voltage VOUT. Accordingly, it is understood that the ratio between the value of a current flowing through the drain terminal of the first sense transistor M130 and the value of a current flowing through the drain terminal of the output transistor M110 is equal to the ratio between the gate size of the first sense transistor M130 and the gate size of the output transistor M110.

SUMMARY OF THE INVENTION

It is known that one of the general measures to protect the circuit from, for example, a surge from the output terminal OUT is to insert a protective resistor 60 between the output terminal OUT and an input terminal of the current detection circuit 70 as in the configuration shown in FIG. 8. However, if the protective resistor 60 is present, a voltage drop that occurs when a current flows through the protective resistor 60 causes a protective current value, which triggers the overcurrent protection, to become lower than a setting value. As a result, even if the current has such a value at which a normal operation is to be performed, an overcurrent protection operation may be erroneously performed.

To be more specific, in a case where the protective resistor 60 is provided, a voltage that is reduced from the output voltage VOUT of the output terminal OUT by the voltage drop of the protective resistor 60 is applied to the source terminal of the transistor M710. On the other hand, the source voltage VS (M704) of the transistor M704 (in other words, the drain voltage VD (M130) of the first sense transistor M130) is equal to a source voltage VS (M710) of the transistor M710 owing to the operation of the above-described current detection circuit 70.

Accordingly, the drain voltage VD (M130) of the first sense transistor M130 is not equal to the drain voltage VD (M110) of the output transistor M110, and is lower than the drain voltage VD (M110) of the output transistor M110 by the voltage drop of the protective resistor 60. The drain-source voltage VDS (M130) of the first sense transistor M130 is higher than a drain-source voltage VDS (M110) of the output transistor M110, and the value of a current flowing through the first sense transistor M130 is higher than in the case where the protective resistor 60 is absent as in the configuration shown in FIG. 7.

FIG. 9 shows load current characteristics of the overcurrent protection. The horizontal axis represents the output current from the output transistor M110, and the vertical axis represents the output voltage VOUT. A solid line indicates the characteristics in the case shown in FIG. 7 where the protective resistor 60 is absent, and a dashed line indicates the characteristics in the case shown in FIG. 8 where the protective resistor 60 is present. It is understood from the comparison of the solid line and the dashed line that an output current value that triggers the overcurrent protection (i.e., the protective current value) is lower in the case where the protective resistor 60 is present.

Not only the voltage drop due to the protective resistor 60 but also a voltage drop due to interconnect resistance between the output terminal OUT and the transistor M710 included in the current detection circuit 70 causes the protective current value, which triggers the overcurrent protection, to become lower than the setting value. The problem due to the interconnect resistance is prominent particularly in a case where the output transistor M110 is disposed near the output terminal OUT and the overcurrent protection circuit 40 is disposed away from the output transistor M110 in a layout on a semiconductor chip.

Further, a current flowing from the output terminal OUT into the overcurrent protection circuit 40 via the protective resistor 60 and the interconnect resistance changes in accordance with a load current value. Therefore, at the time of setting the protective current value, which triggers the overcurrent protection, it is necessary to take account of changes in the voltage drops due to the protective resistor 60 and the interconnect resistance. Considering the protection of the internal circuit, it is desirable that the resistance value of the protective resistor 60 be set as large as possible. However, since the current flowing from the output terminal OUT into the overcurrent protection circuit 40 changes in accordance with a load current value, it is necessary to set the resistance value of the protective resistor 60 in consideration of the maximum value of the current flowing into the overcurrent protection circuit 40. Thus, setting the resistance value of the protective resistor 60 to a large value is restricted due to the voltage drops. As a result, the internal circuit cannot be protected sufficiently.

The present invention solves the above-described conventional problems. An object of the present invention is to provide a constant-voltage circuit including an overcurrent protection circuit capable of reducing the influence of a protective resistor and interconnect resistance and improving the accuracy of overcurrent protection.

In order to solve the above-described problems, a constant-voltage circuit according to one aspect of the present invention includes: an output transistor including a pair of main terminals connected to input and output terminals of the constant-voltage circuit, respectively, the input terminal being a terminal to which an input voltage is applied, the output terminal being a terminal from which an output voltage is obtained; an error amplifier configured to cause the output voltage of the output terminal to be constant by applying, to a control terminal of the output transistor, a control voltage corresponding to an error between a voltage corresponding to the output voltage and a reference voltage; and an overcurrent protection circuit configured to detect whether an output current from the output transistor is an overcurrent, and control the output transistor to be in a non-conductive state when having detected that the output current is the overcurrent. The overcurrent protection circuit includes: a first sense transistor, one main terminal of which is connected to the input terminal and a control terminal of which is connected to the control terminal of the output transistor, the first sense transistor being configured to generate a current corresponding to the output current from the output transistor; a voltage level adjusting circuit configured to generate a voltage corresponding to a voltage of the main terminal of the output transistor at the output terminal side by extracting, from the main terminal of the output transistor at the output terminal side, a current that is not affected by a change in the output current from the output transistor, and adjust a voltage of another main terminal of the first sense transistor such that the adjusted voltage becomes equal to the generated voltage; and a protection circuit configured to control the control voltage applied from the error amplifier to the control terminal of the output transistor, the protection circuit controlling the control voltage in accordance with the current generated by the first sense transistor.

According to the above-described configuration, one of the main terminals of the output transistor and the one main terminal of the first sense transistor are connected to each other, and the control terminal of the output transistor and the control terminal of the first sense transistor are connected to each other. As a result, the operating state of the first sense transistor becomes the same as the operating state of the output transistor. Consequently, characteristics of the current generated by the first sense transistor are substantially the same as characteristics of the output current flowing through the output transistor. Here, the protection circuit controls the control voltage applied to the control terminal of the output transistor in accordance with the current generated by the first sense transistor. Therefore, if the characteristics of the current generated by the first sense transistor are substantially the same as the characteristics of the output current flowing through the output transistor, then highly accurate overcurrent protection highly reflecting the output current flowing through the output transistor is performed. Further, the voltage level adjusting circuit included in the overcurrent protection circuit adjusts not the output current flowing through the output transistor but the voltage of the main terminal of the output transistor at the output terminal side and the voltage of the other main terminal of the first sense transistor. That is, the voltage level adjusting circuit generates a voltage corresponding to the voltage of the main terminal of the output transistor at the output terminal side by extracting, from the main terminal of the output transistor at the output terminal side, a current that is not affected by a change in the output current from the output transistor and that does not affect the current generated by the first sense transistor, and adjusts the voltage of the other main terminal of the first sense transistor such that the adjusted voltage becomes equal to the generated voltage. This makes it possible for the overcurrent protection circuit to perform overcurrent protection without being affected by a protective resistor, or interconnect resistance, provided between the main terminal of the output transistor and an input terminal of the overcurrent protection circuit.

In the above constant-voltage circuit, the overcurrent protection circuit may include a second sense transistor, one main terminal of which is connected to the input terminal and a control terminal of which is connected to an output terminal of the error amplifier. The voltage level adjusting circuit may include: a first transistor, one main terminal of which is connected to the main terminal of the output transistor at the output terminal side and another main terminal and a control terminal of which are shorted to each other; a current source element connected to the other main terminal of the first transistor; a second transistor, one main terminal of which is connected to another main terminal of the second sense transistor and a control terminal of which is connected to the control terminal of the first transistor; a third transistor, one main terminal of which is connected to the other main terminal of the second sense transistor and another main terminal and a control terminal of which are shorted to each other; a current mirror circuit configured such that a current flowing out of another main terminal of the second transistor is an input current to the current mirror circuit, and a current flowing out of the other main terminal of the third transistor becomes a duplicate current, which is a duplicate of the input current; and a fourth transistor, one main terminal of which is connected to the other main terminal of the first sense transistor, another main terminal of which is connected to an input terminal of the protection circuit, and a control terminal of which is connected to the control terminal of the third transistor. Here, the one main terminal of the first transistor may be connected to the main terminal of the output transistor at the output terminal side by either direct connection or indirect connection via a protective resistor.

In the above constant-voltage circuit, an aspect ratio of the third transistor may be set to be less than each of an aspect ratio of the second transistor and an aspect ratio of the fourth transistor.

According to the above configuration, in a case where a protective resistor is provided between the main terminal of the output transistor and the input terminal of the overcurrent protection circuit, if it is assumed that a voltage drop at the protective resistor is made small enough to be ignorable through adjustment of a current value of the current source element, then a control voltage applied to the control terminal of the first transistor is a voltage that is reduced from the output voltage by a voltage between the control terminal and the one main terminal of the first transistor, and the control voltage is applied to the control terminal of the second transistor. Here, the voltage between the control terminal and the one main terminal of the first transistor is a constant value corresponding to the current value of the current source element.

By level-shifting the control voltage of the second transistor, the voltage of the other main terminal of the fourth transistor (the voltage of the other main terminal of the first sense transistor) is set. In other words, control is performed so that even if currents flowing through the first sense transistor and the second sense transistor have changed, the potential difference between the control voltage of the second transistor and the voltage of the other main terminal of the fourth transistor will be constant.

Assume here that the following condition holds true: "the aspect ratio of the third transistor<the aspect ratio of each of the second transistor and the fourth transistor". In this case, the voltage of the other main terminal of the fourth transistor is such a voltage as to be: slightly increased from the control voltage of the second transistor by a voltage between the control terminal and the one main terminal of the second transistor; then greatly reduced by a voltage between the control terminal and the one main terminal of the third transistor; and then slightly increased by a voltage between the control terminal and the one main terminal of the fourth transistor. Even if currents flowing through the respective second, third, and fourth transistors have changed, the voltage relationship as described above will be constant.

Thus, the voltage of the main terminal of the output transistor at the output terminal side and the voltage of the other main terminal of the first sense transistor can be made equal to each other by causing the potential difference between the control voltage of the second transistor and the voltage of the one main terminal of the fourth transistor to be equal to the voltage between the control terminal and the one main terminal of the first transistor. In other words, the operating state of the output transistor and the operating state of the first sense transistor can be made the same without being affected by the protective resistor or interconnect resistance. This consequently makes it possible to realize a constant-voltage circuit including an overcurrent protection circuit with improved overcurrent protection accuracy.

In the above constant-voltage circuit, the current source element of the voltage level adjusting circuit may be either a constant current source or a resistor.

According to the above configuration, the influence of the protective resistor, or the influence of interconnect resistance between the output terminal and the one main terminal of the first transistor, the interconnect resistance replacing the protective resistor, can be reduced by setting the value of the constant current source to a small value. Accordingly, in a layout on a semiconductor chip, freedom in the arrangement of the output transistor, the output terminal, and the overcurrent protection circuit is increased compared to conventional configurations. Since the value of a current flowing from the output transistor into the voltage level adjusting circuit is set by the constant current source, the value of the current is constant regardless of changes in a load current. Therefore, adjustment of the resistance value of the protective resistor or interconnect resistance in consideration of changes in the current flowing into the voltage level adjusting circuit is unnecessary. Further, by setting the value of the constant current source to a small value, the resistance value of the protective resistor or interconnect resistance can be set to a large value. This makes it possible to improve internal circuit protective effects compared to conventional configurations. It should be noted that the above-described advantageous effects can be provided even if the constant current source is replaced by a resistor. In this case, the resistance value of the resistor is set to such a value as to correspond to the internal impedance of the constant current source.

In the above constant-voltage circuit, the protection circuit may include: a first current/voltage converter configured to convert the current generated by the first sense transistor into a first voltage; a first switch whose conduction is controlled in accordance with the first voltage such that a current corresponding to the first voltage flows through the first switch; a second current/voltage converter configured to convert the current flowing through the first switch into a second voltage; and a second switch interposed between the input terminal and the control terminal of the output transistor, the second switch being configured such that conduction between the input terminal and the control terminal of the output transistor is controlled in accordance with the second voltage.

The above constant-voltage circuit may include a protective resistor provided between the main terminal of the output transistor at the output terminal side and the overcurrent protection circuit.

The present invention makes it possible to provide a constant-voltage circuit including an overcurrent protection circuit capable of reducing the influence of a protective resistor and interconnect resistance and improving the accuracy of overcurrent protection.

The above and further objects, features, and advantages of the present invention will more fully be apparent from the following detailed description of embodiments with accompanying drawings.

DESCRIPTION OF THE PREFERRED EMBODIMENTS

Figure 1:
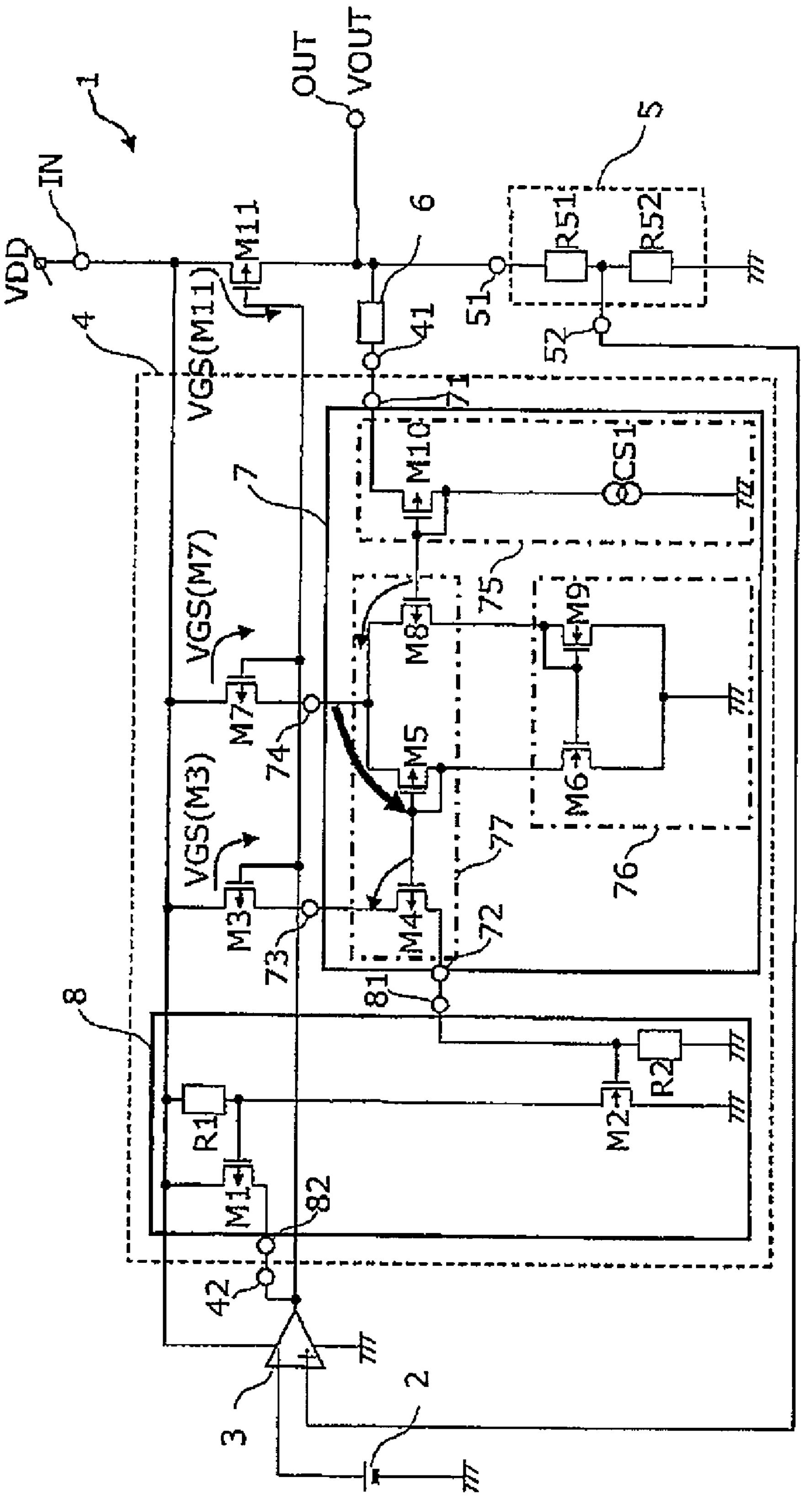
FIG. 1 is a circuit diagram showing the configuration of a constant-voltage circuit according to Embodiment 1 of the present invention.

Hereinafter, preferred embodiments of the present invention will be described with reference to the accompanying drawings. In the drawings, the same or corresponding elements are denoted by the same reference signs, and repeating the same descriptions is avoided below.

Embodiment 1

[Example of Configuration of Constant-Voltage Circuit]

FIG. 1 shows an example of the configuration of a constant-voltage circuit according to Embodiment 1 of the present invention.

A constant-voltage circuit 1 shown in FIG. 1 includes: an input terminal IN; an output terminal OUT; a constant voltage source 2; an error amplifier 3; an overcurrent protection circuit 4; a voltage divider circuit 5; an output transistor M11; and a protective resistor 6. The protective resistor 6 herein may be configured as a resistance element or realized by interconnect resistance. The output transistor M11 is configured as a PMOS transistor. The input terminal IN is connected to a source terminal of the output transistor M11. A gate terminal of the output transistor M11 is connected to an output terminal of the error amplifier 3. The constant voltage source 2 is connected to an inverting input terminal of the error amplifier 3. An output terminal 52 of the voltage divider circuit 5 is connected to a non-inverting input terminal of the error amplifier 3. A drain terminal of the output transistor M11 is connected to the output terminal OUT, an input terminal 41 of the overcurrent protection circuit 4, and an input terminal 51 of the voltage divider circuit 5. The voltage divider circuit 5 is configured such that the input terminal 51 and one end of a resistor R51 are connected; the other end of the resistor R51 and one end of a resistor R52 are connected; and a connection point where the resistors R51 and R52 are connected is connected to the output terminal 52. The other end of the resistor R52 is connected to the ground. The protective resistor 6 is provided between the output terminal OUT and the input terminal 41 of the overcurrent protection circuit 4.

[Example of Configuration of Overcurrent Protection Circuit]

The overcurrent protection circuit 4 shown in FIG. 1 includes: the input terminal 41; an output terminal 42; a voltage level adjusting circuit 7; a protection circuit 8; a first sense transistor M3; and a second sense transistor M7. It should be noted that the first sense transistor M3 and the second sense transistor M7 are configured as PMOS transistors. The input terminal 41 of the overcurrent protection circuit 4 is connected to a first input terminal 71 of the voltage level adjusting circuit 7. A source terminal of the first sense transistor M3 and a source terminal of the second sense transistor M7 are connected to the input terminal IN. A gate terminal of the first sense transistor M3 and a gate terminal of the second sense transistor M7 are connected to the gate terminal of the output transistor M11 and the output terminal of the error amplifier 3. A drain terminal of the first sense transistor M3 is connected to a second input terminal 73 of the voltage level adjusting circuit 7. A drain terminal of the second sense transistor M7 is connected to a third input terminal 74 of the voltage level adjusting circuit 7. An output terminal 72 of the voltage level adjusting circuit 7 is connected to an input terminal 81 of the protection circuit 8. An output terminal 82 of the protection circuit 8 is connected to the output terminal 42 of the overcurrent protection circuit 4 and the output terminal of the error amplifier 3.

[Example of Configuration of Voltage Level Adjusting Circuit]

The voltage level adjusting circuit 7 shown in FIG. 1 includes the first input terminal 71, the second input terminal 73, the third input terminal 74, the output terminal 72, transistors M4, M5, M6, M8, M9, M10, and a constant current source CS1. It should be noted that the transistors M4, M5, M6, M8, M9, and M10 shown in FIG. 1 are configured as a PMOS transistor, a PMOS transistor, an NMOS transistor, a PMOS transistor, an NMOS transistor, and a PMOS transistor, respectively.

The first input terminal 71 is connected to a source terminal of the transistor M10. A gate terminal and a drain terminal of the transistor M10 are shorted to each other, and the drain terminal of the transistor M10 is connected to the constant current source CS1. The gate terminal of the transistor M10 is connected to a gate terminal of the transistor M8. A source terminal of the transistor M8 is connected to the third input terminal 74 and a source terminal of the transistor M5. A gate terminal and a drain terminal of the transistor M5 are shorted to each other, and the gate terminal of the transistor M5 is connected to a gate terminal of the transistor M4. A source terminal of the transistor M4 is connected to the second input terminal 73, and a drain terminal of the transistor M4 is connected to the output terminal 72.

Drain terminals of the respective transistors M5 and M8 are connected to drain terminals of the respective transistors M6 and M9. The drain terminal of the transistor M8 is connected to the drain terminal of the transistor M9. The drain terminal and gate terminal of the transistor M9 are shorted to each other, and the gate terminal of the transistor M9 is connected to a gate terminal of the transistor M6. The drain terminal of the transistor M5 is connected to the drain terminal of the transistor M6. A source terminal of the transistor M9 and a source terminal of the transistor M6 are connected to the ground.

It should be noted that the transistor M10 and the constant current source CS1 form a voltage generator 75; the transistor M6 and the transistor M9 form a current mirror 76; and the transistor M4, the transistor M5, and the transistor M8 form a voltage level shifter 77.

[Example of Configuration of Protection Circuit]

The protection circuit 8 shown in FIG. 1 includes the input terminal 81, the output terminal 82, transistors M1 and M2, and resistors R1 and R2. It should be noted that the transistor M1 and the transistor M2 shown in FIG. 1 are configured as a PMOS transistor and an NMOS transistor, respectively. The input terminal 81 is connected to one end of the resistor R2 and a gate terminal of the transistor M2. The other end of the resistor R2 is connected to the ground. One end of the resistor R1 is connected to the input terminal IN, and the other end of the resistor R1 is connected to a drain terminal of the transistor M2 and a gate terminal of the transistor M1. A source terminal of the transistor M1 is connected to the input terminal IN. A drain terminal of the transistor M1 is connected to the gate terminal of the output transistor M11 and the output terminal of the error amplifier 3 via the output terminal 82 and the output terminal 42 of the overcurrent protection circuit 4.

It should be noted that the resistor R2 serves as a first current/voltage converter, which converts a current generated by the first sense transistor M3 into a first voltage. The transistor M2 serves as a first switch whose conduction is controlled in accordance with the first voltage such that a current corresponding to the first voltage flows through the first switch. The resistor R1 serves as a second current/voltage converter, which converts the current flowing through the first switch into a second voltage. The transistor M1 serves as a second switch interposed between the input terminal IN and the gate terminal of the output transistor M11. The second switch controls the conduction between the input terminal IN and the gate terminal of the output transistor M11 in accordance with the second voltage. It should be noted that the configurations of the first current/voltage converter, the first switch, the second current/voltage converter, and the second switch are not limited to the above-described configurations.

[Example of Operation of Constant-Voltage Circuit]

Hereinafter, an example of the operation of the constant-voltage circuit 1 shown in FIG. 1 is described. The constant-voltage circuit 1 generates a constant output voltage VOUT based on an input voltage (power supply voltage) VDD applied to the input terminal IN, and outputs the output voltage VOUT from the output terminal OUT. Specifically, the output voltage VOUT is divided by the voltage divider circuit 5. The error amplifier 3 compares a voltage obtained by the voltage division by the voltage divider circuit 5 (the obtained voltage is hereinafter referred to as a "divided voltage") with a reference voltage from the reference voltage source 2. In accordance with a result of the comparison, a gate-source voltage VGS (M11) of the output transistor M11 is controlled.

If the divided voltage from the voltage divider circuit 5 is lower than the reference voltage from the reference voltage source 2, the output from the error amplifier 3 decreases, and a gate voltage VG (M11) of the output transistor M11 decreases. As a result, the output resistance of the output transistor M11 decreases, and the output voltage VOUT increases. On the other hand, if the divided voltage from the voltage divider circuit 5 is higher than the reference voltage from the reference voltage source 2, the output from the error amplifier 3 increases, and the gate voltage VG (M11) of the output transistor M11 increases. As a result, the output resistance of the output transistor M11 increases, and the output voltage VOUT decreases.

As described above, the constant-voltage circuit 1 operates in such a manner as to cause the output voltage VOUT from the output terminal OUT to be a constant value.

[Example of Operation of Overcurrent Protection Circuit]

Hereinafter, an example of the operation of the overcurrent protection circuit 4 shown in FIG. 1 is described. The drain terminal of the first sense transistor M3 and the drain terminal of the second sense transistor M7 are connected to the voltage level adjusting circuit 7. Owing to the operation of the voltage level adjusting circuit 7, a drain voltage VD (M3) of the first sense transistor M3 and a drain voltage VD (M11) of the output transistor M11 are equal to each other.

The source terminal of the first sense transistor M3 and the source terminal of the output transistor M11 are connected to the input terminal IN. The gate terminal of the first sense transistor M3 and the gate terminal of the output transistor M11 are connected to the output terminal of the error amplifier 3. Accordingly, a gate-source voltage VGS (M3) of the first sense transistor M3 and the gate-source voltage VGS (M11) of the output transistor M11 are equal to each other.

It is understood that, owing to the above-described voltage relationship, a drain-source voltage VDS (M3) of the first sense transistor M3 and a drain-source voltage VDS (M11) of the output transistor M11 are equal to each other. Accordingly, drain currents corresponding to the ratio between the gate size of the first sense transistor M3 and the gate size of the output transistor M11 flow through the drain terminals of the first sense transistor M3 and the output transistor M11, respectively. It should be noted that the drain current of the first sense transistor M3 is inputted to the input terminal 81 of the protection circuit 8 via the output terminal 72 of the voltage level adjusting circuit 7.

The protection circuit 8 controls the gate voltage VG (M11) of the output transistor M11 in accordance with the value of the current inputted to the input terminal 81. Specifically, the current inputted to the input terminal 81 is converted by the resistor R2 into a voltage, and the converted voltage is applied to the gate terminal of the transistor M2. If a gate-source voltage VGS (M2) of the transistor M2 exceeds a threshold voltage VTH2 of the transistor M2, then the transistor M2 becomes a conductive state and a current flows through the resistor R1, so that a voltage drop at the resistor R1 increases. As a result, the transistor M1 whose gate terminal is connected to one end of the resistor R1 becomes a conductive state, and the voltage of the output terminal 82 of the protection circuit 8 becomes the voltage of the input terminal IN. Accordingly, the voltage of the output terminal 42 of the overcurrent protection circuit 4 becomes the voltage of the input terminal IN; the gate voltage VG (M11) of the output transistor M11 becomes equal to a source voltage VS (M11) of the output transistor M11; the gate-source voltage VGS (M11) of the output transistor M11 becomes zero; and the output transistor M11 becomes a non-conductive state. Consequently, such an overcurrent protection operation as to stop supplying a current to a load connected to the output terminal OUT is performed. It should be noted that a protective current value, which triggers the overcurrent protection operation, may be set to any value by changing the resistance value of the resistor R2.

Figure 8:
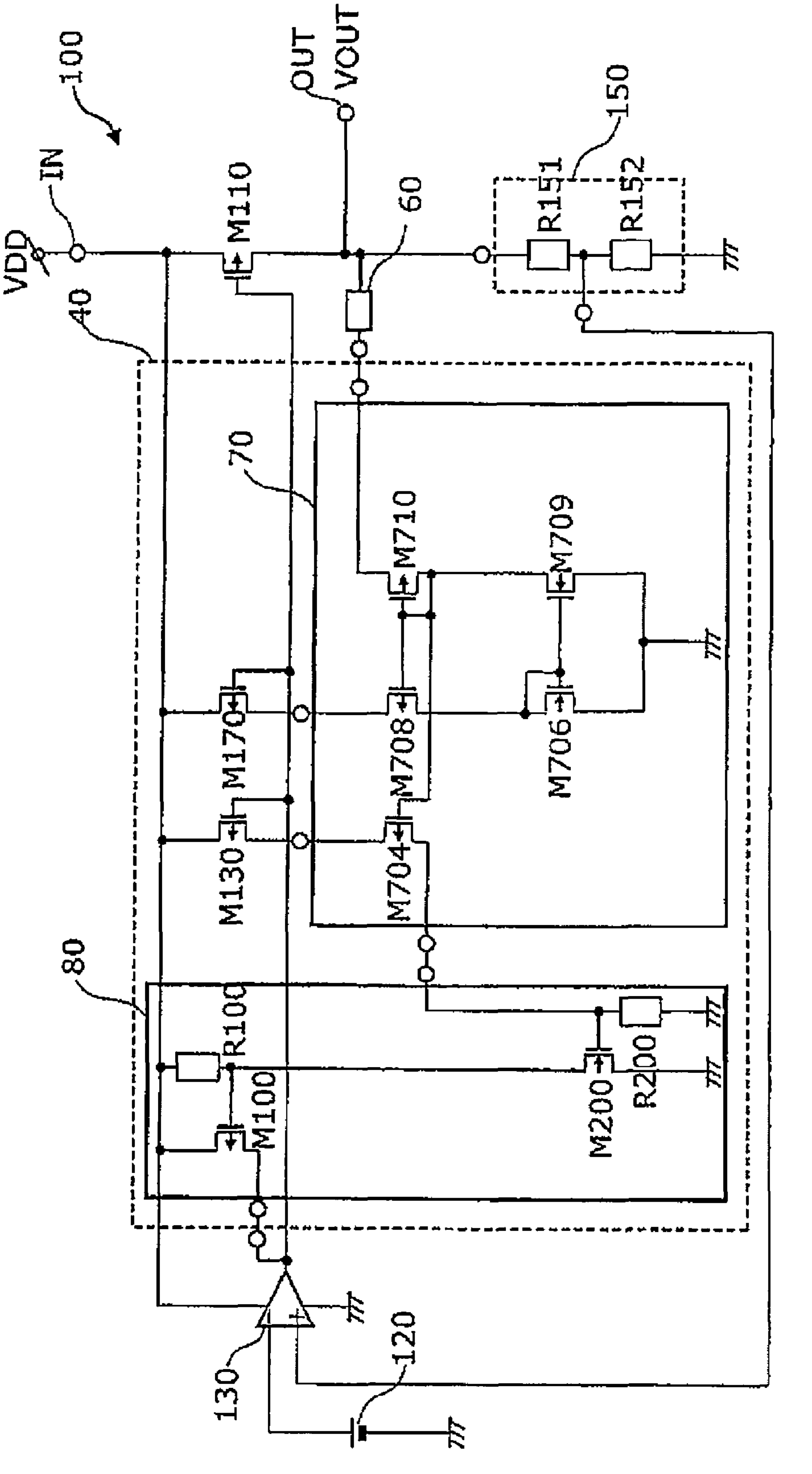
PRIOR ART Fig. 8
FIG. 8 is a circuit diagram showing a configuration in which a protective resistor is added to the conventional constant-voltage circuit.
Figure 9:
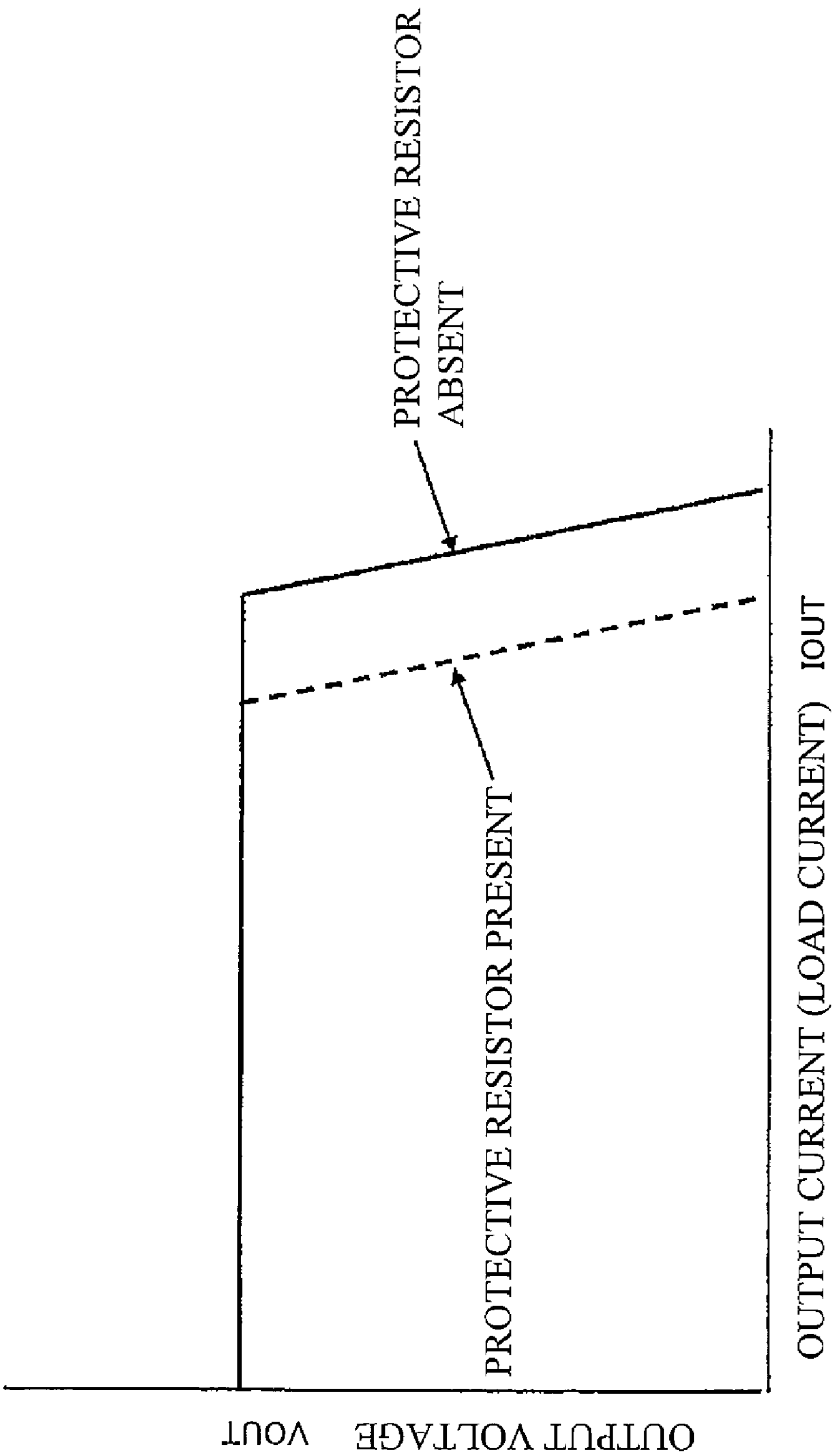
PRIOR ART Fig. 9
FIG. 9 is a graph showing a relationship between an output current and an output voltage of the conventional constant-voltage circuit.

It should be noted that, in the conventional overcurrent protection circuit 40 shown in FIG. 8, the current detection circuit 70 is used. The present embodiment is different from the conventional overcurrent protection circuit 40 in that, in the present embodiment, the voltage level adjusting circuit 7 is used instead of the current detection circuit 70. In the description below, the operation of the voltage level adjusting circuit 7 is described in detail.

[Example of Operation of Voltage Level Adjusting Circuit 7]

First, a description of an example of the operation of the voltage level adjusting circuit 7 shown in FIG. 1 is given for each of the following functional blocks: the voltage generator 75; the current mirror 76; and the voltage level shifter 77. It should be noted that, in the description below, although the protective resistor 6 is connected between the output terminal OUT and the source terminal of the transistor M10, a voltage drop occurring at the protective resistor 6 is assumed to be ignorable since the current value of the constant current source CS1 can be set to a small value.

The voltage generator 75 is configured to generate a voltage between the gate and source of the transistor M10 in accordance with the output voltage VOUT. If, as mentioned above, it is assumed here that the voltage drop at the protective resistor 6 is made small enough to be ignorable through the adjustment of the current value of the constant current source CS1, then a gate voltage VG (M10) of the transistor M10 is a voltage (VOUT−VGS (M10)), which is a voltage reduced from the output voltage VOUT by a gate-source voltage VGS (M10) of the transistor M10. The voltage (VOUT−VGS (M10)) is applied to the gate terminal of the transistor M8 of the voltage level shifter 77. It should be noted that the gate-source voltage VGS (M10) of the transistor M10 is set to a constant value corresponding to the current value of the constant current source CS1. That is, the voltage level adjusting circuit 7 can eliminate the influence of the protective resistor 6 since the voltage generator 75 deals with not the output current flowing into the voltage generator 75 via the protective resistor 6, but the output voltage VOUT.

The current mirror 76 duplicates a current having flowed into the drain terminal of the transistor M9 as a drain current of the transistor M6. It should be noted that the mirror ratio of the current mirror 76 is 1:1.

The voltage level shifter 77 level-shifts a gate voltage VG (M8) of the transistor M8, thereby setting the voltage of the second input terminal 73 (i.e., setting a source voltage VS (M4) of the transistor M4 and the drain voltage VD (M3) of the first sense transistor M3). The voltage level shifter 77 also performs control so that even if the drain current of the first sense transistor M3 and the drain current of the second sense transistor M7 have changed, the potential difference between the gate voltage VG (M8) of the transistor M8 and the source voltage VS (M4) of the transistor M4 (=VG (M8)−VS (M4)) will be constant.

Assume here that the following condition holds true: "the aspect ratio of the transistor M5<the aspect ratio of each of the transistors M8 and M4". In this case, the source voltage VS (M4) of the transistor M4 is such a voltage as to be: slightly increased from the gate voltage VG (M8) of the transistor M8 by a gate-source voltage VGS (M8) of the transistor M8; then greatly reduced by a gate-source voltage VGS (M5) of the transistor M5; and then slightly increased by a gate-source voltage VGS (M4) of the transistor M4.

Even if the source currents of the respective transistors M8, M5, and M4 have changed, the voltage relationship as described above will not be affected by such changes and stay constant. Accordingly, the voltage of the first input terminal 71 and the voltage of the second input terminal 73 can be made equal to each other by causing the potential difference between the gate voltage VG (M8) of the transistor M8 and the source voltage VS (M4) of the transistor M4 (=VG (M8)−VS (M4)) to be equal to the gate-source voltage VGS (M10) of the transistor M10. In other words, a current that is not affected by changes in the output current from the output transistor M11 and that does not affect the current generated by the first sense transistor M3 is extracted from the drain of the output transistor M11 at the output terminal OUT side (the drain serving as a main terminal), and thereby a voltage corresponding to the voltage of the drain of the output transistor M11 at the output terminal OUT side (the drain serving as the main terminal) is generated. The voltage of the drain of the first sense transistor M3 (the drain serving as another main terminal) is adjusted to be equal to the generated voltage. In this manner, the operating state of the output transistor M11 and the operating state of the first sense transistor M3 can be made the same without being affected by changes in the current flowing in from the output terminal OUT via the protective resistor 6.

Next, detailed operations performed within the voltage level adjusting circuit 7 are described.

First, in the transistor M10, the gate terminal and the drain terminal are shorted to each other; the drain voltage VOUT of the output transistor M11 is applied to the source terminal; and the drain terminal is connected to the ground via the constant current source CS1. Accordingly, the gate-source voltage VGS (M10) of the transistor M10 is generated.

The gate terminal of the transistor M8 is connected to the gate terminal of the transistor M10. Accordingly, the generated gate-source voltage VGS (M10) of the transistor M10 is applied to the gate terminal of the transistor M8. That is, the gate voltage VG (M8) of the transistor M8 is the gate voltage VG (M10) of the transistor M10.

Part of a drain current I7 of the second sense transistor M7 becomes a source current I8 of the transistor M8, and the gate-source voltage VGS (M8) of the transistor M8 is generated. At the time, a source voltage VS (M8) of the transistor M8 is represented by an equation shown below.

$$\begin{aligned} VS(M8) &= VG(M8) + VGS(M8) \\ &= VG(M8) + \{\sqrt{(I8/K8)} + VTH8\} \end{aligned} \quad \text{(Equation 1)}$$

It should be noted that the relationship of "VGS (M8)={√(I8/K8)+VTH8}" in Equation 1 is obtained in the following manner. That is, generally speaking, a drain current ID in the non-saturated region of a MOS transistor is represented by an equation shown below.

$$\begin{aligned} ID &= (1/2) \times \mu S \times COX \times (W/L) \times (VGS - VTH)^2 \\ &= K \times (VGS - VTH)^2 \end{aligned} \quad \text{(Equation 2)}$$

In Equation 2, "COX" represents a gate oxide film capacitance of the MOS transistor; "μS" represents a majority carrier surface mobility; "L" represents a gate length; "W" represents a gate width; "VGS" represents a gate-source voltage; and "VTH" represents a threshold voltage. Further, "K" is a proportionality coefficient, which is represented by an equation shown below.

$$K = (½) \times \mu S \times COX \times (W/L) \quad \text{(Equation 3)}$$

By modifying Equation 2, the gate-source voltage VGS is represented by an equation shown below, using "K" and "ID".

$$VGS = \sqrt{(ID/K)} + VTH \quad \text{(Equation 4)}$$

Assume here that, in Equation 4, "VGS" is the gate-source voltage VGS (M8) of the transistor M8; "ID" is the current I8 flowing through the transistor M8; the gate length "L" and the gate width "W" of the transistor M8 are L8 and W8, respectively; "K" is such that K8=(½)×μS×COX×(W8/L8); and "VTH" is a threshold voltage VTH8 of the transistor M8. Consequently, the result of Equation 1 is obtained.

Owing to an operation of the current mirror 76 formed by the transistor M9 and the transistor M6, a current from the drain terminal of the transistor M8 flows between the drain terminal of the second sense transistor M7 and the drain terminal of the transistor M6 via the diode-connected transistor M5. As a result, the gate-source voltage VGS (M5) of the transistor M5 is generated owing to a current I5 flowing between the gate and the source of the diode-connected transistor M5.

With use of Equation 1, a gate voltage VG (M5) of the transistor M5 is represented by an equation shown below.

$$\begin{aligned} VG(M5) &= VS(M8) - VGS(M5) \\ &= VS(M8) - \{\sqrt{(I5/K5)} + VTH5\} \\ &= VG(M8) + \{\sqrt{(I8/K8)} - \\ &\quad \sqrt{(I5/K5)}\} + VTH8 - VTH5 \end{aligned} \quad \text{(Equation 5)}$$

Since the gate terminal of the transistor M4 is connected to the gate terminal of the transistor M5, the gate voltage VG (M5) of the transistor M5 is applied to the gate terminal of the transistor M4. Further, since a drain current I3 of the first sense transistor M3 is supplied as a source current I4 of the transistor M4, the gate-source voltage VGS (M4) of the transistor M4 is generated.

With use of Equation 5, the source voltage VS (M4) of the transistor M4 is represented by an equation below.

$$\begin{aligned} VS(M4) &= VG(M5) + VGS(M4) \\ &= VG(M8) + \{\sqrt{(I8/K8)} - \sqrt{(I5/K5)} + \\ &\quad \sqrt{(I4/K4)}\} + VTH8 - VTH5 + VTH4 \end{aligned} \quad \text{(Equation 6)}$$

As described above, the source voltage VS (M8) of the transistor M8, the gate voltage VG (M5) of the transistor M5, and the source voltage VS (M4) of the transistor M4 in the voltage level adjusting circuit 7 are represented by Equation 1, Equation 5, and Equation 6, respectively.

Here, if the drain current of the first sense transistor M3 and the drain current of the second sense transistor M7 are represented as the same "ISEN", then the source current I8 of the transistor M8 is "(½)×ISEN"; the source current I5 of the transistor M5 is "(½)×ISEN"; and the source current I4 of the transistor M4 is "ISEN". In this case, Equation 1, Equation 5, and Equation 6 are represented as equations shown below.

$$VS(M8) = VG(M8) + \sqrt{ISEN} \times \sqrt{(½ \times 1/K8)} + VTH8 \quad \text{(Equation 7)}$$

$$VG(M5) = VG(M8) + \sqrt{ISEN} \times \{\sqrt{(½ \times 1/K8)} - \sqrt{(½ \times 1/K5)}\} + VTH8 - VTH5 \quad \text{(Equation 8)}$$

$$VS(M4) = VG(M8) + \sqrt{ISEN} \times \{\sqrt{(½ \times 1/K8)} - I(½ \times 1/K5) + \sqrt{(1/K4)}\} + VTH8 - VTH5 + VTH4 \quad \text{(Equation 9)}$$

Assume here that an equation shown below holds true in Equation 9.

$$\{\sqrt{(½ \times 1/K8)} - \sqrt{(½ \times 1/K5)} + \sqrt{(1/K4)}\} = 0 \quad \text{(Equation 10)}$$

It should be noted that a combination of K8, K5, and K4 that allows Equation 10 to hold true is set, for example, as shown below.

$$K8 = 8, K5 = 2, K4 = 16 \quad \text{(Equation 11)}$$

If the above settings in Equation 11 are assigned to Equation 7, Equation 8, and Equation 9, then Equation 7, Equation 8, and Equation 9 are represented as equations shown below.

$$VS(M8)=VG(M8)+\sqrt{ISEN}\times(1/4)+VTH8 \quad \text{(Equation 12)}$$

$$VG(M5)=VG(M8)+\sqrt{ISEN}\times(-1/4)+VTH8-VTH5 \quad \text{(Equation 13)}$$

$$VS(M4)=VG(M8)+VTH8-VTH5+VTH4 \quad \text{(Equation 14)}$$

As shown in Equation 14, since the equation representing the source voltage VS (M4) of the transistor M4 does not include terms of the drain current ISEN of the first sense transistor M3 and the drain current ISEN of the second sense transistor M7, it is understood that the source voltage VS (M4) of the transistor M4 is not affected by the drain current ISEN of the first sense transistor M3 and the drain current ISEN of the second sense transistor M7.

[Example of Numerical Values of Voltage Level Adjusting Circuit 7]

Next, as one example, in Equation 12, Equation 13, and Equation 14, it is assumed that the gate voltage VG (M8) of the transistor M8 is 2 [V]; the threshold voltage VTH8 of the transistor M8 is 0.6 [V]; a threshold voltage VTH5 of the transistor M5 is 0.6 [V]; and a threshold voltage VTH4 of the transistor M4 is 0.6 [V]. By using this numerical value example, the operation of the voltage level adjusting circuit 7 is described below with reference to FIG. 2 to FIG. 4.

Figure 2:
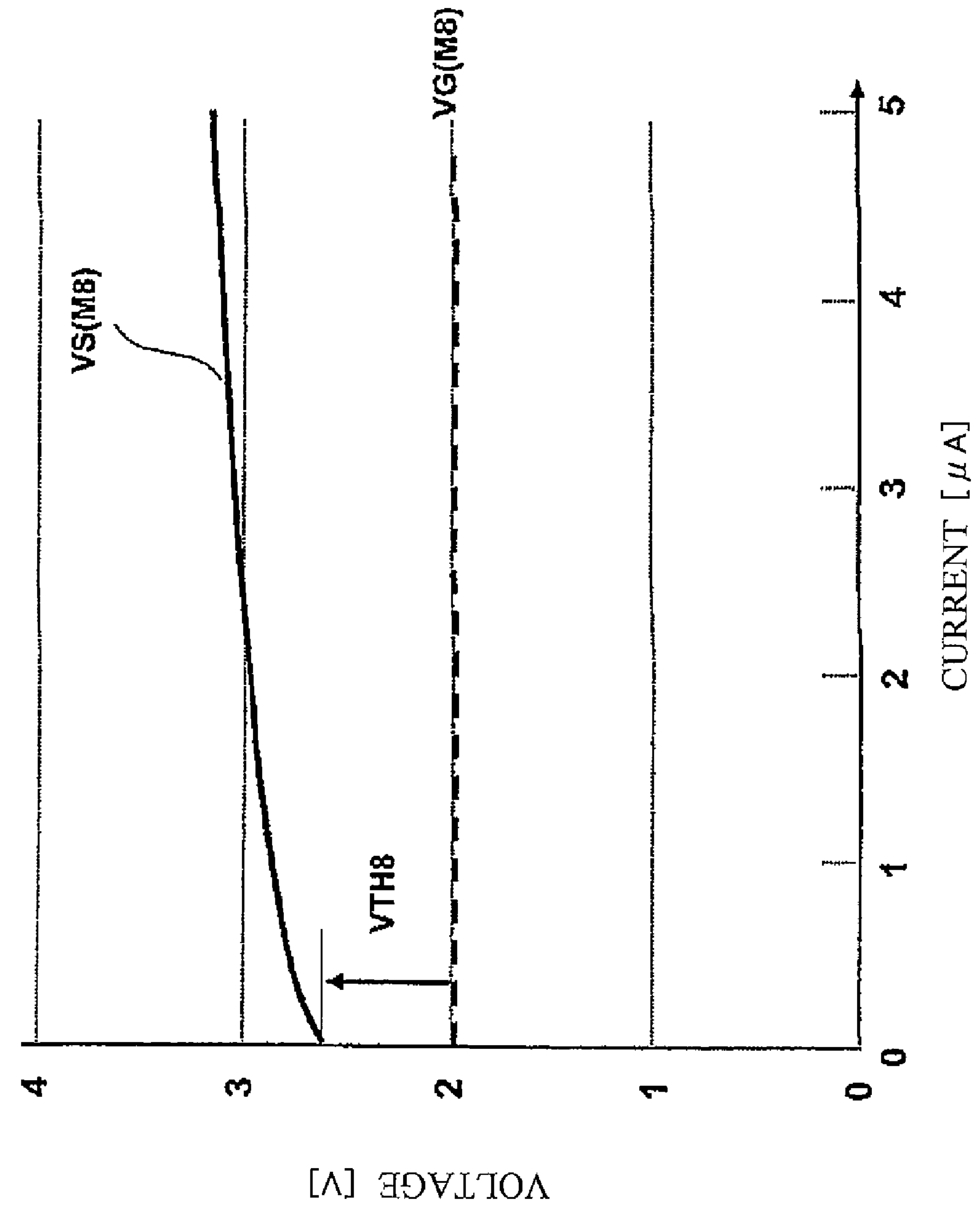
FIG. 2 shows a source voltage VS (M8) of a transistor M8 when a drain current ISEN is changed in Embodiment 1 of the present invention.

First, in FIG. 2, a dashed line indicates characteristics of the gate voltage VG (M8) of the transistor M8, and a solid line indicates characteristics of the source voltage VS (M8) of the transistor M8 when the drain current ISEN is changed by using Equation 12.

Since the gate terminal of the transistor M8 and the gate terminal of the transistor M10 are connected, the voltage VG (M8) applied to the gate terminal of the transistor M8 is the gate voltage VG (M10) generated in the transistor M10. It should be noted that the gate voltage VG (M10) generated in the transistor M10 is a voltage that is reduced, by the gate-source voltage VGS (M10) of the transistor M10, from the output voltage VOUT which is the drain voltage of the output transistor M11. Since the drain voltage VOUT of the output transistor M11 and the gate-source voltage VGS (M10) of the transistor M10 are irrelevant to the drain current ISEN of the transistor M8, the gate voltage VG (M10), i.e., the gate voltage VG (M8), is always "2 V" regardless of changes in the current value of the drain current ISEN of the transistor M8.

Meanwhile, the source voltage VS (M8) of the transistor M8 changes along a curve represented by the term "$\sqrt{ISEN}\times(1/4)$" in Equation 12, starting from a point where the voltage is higher, by the threshold voltage VTH8 of the transistor M8=0.6 [V], than the gate voltage VG (M8) of the transistor M8=2 [V] when the drain current ISEN is 0 [uA].

Figure 3:
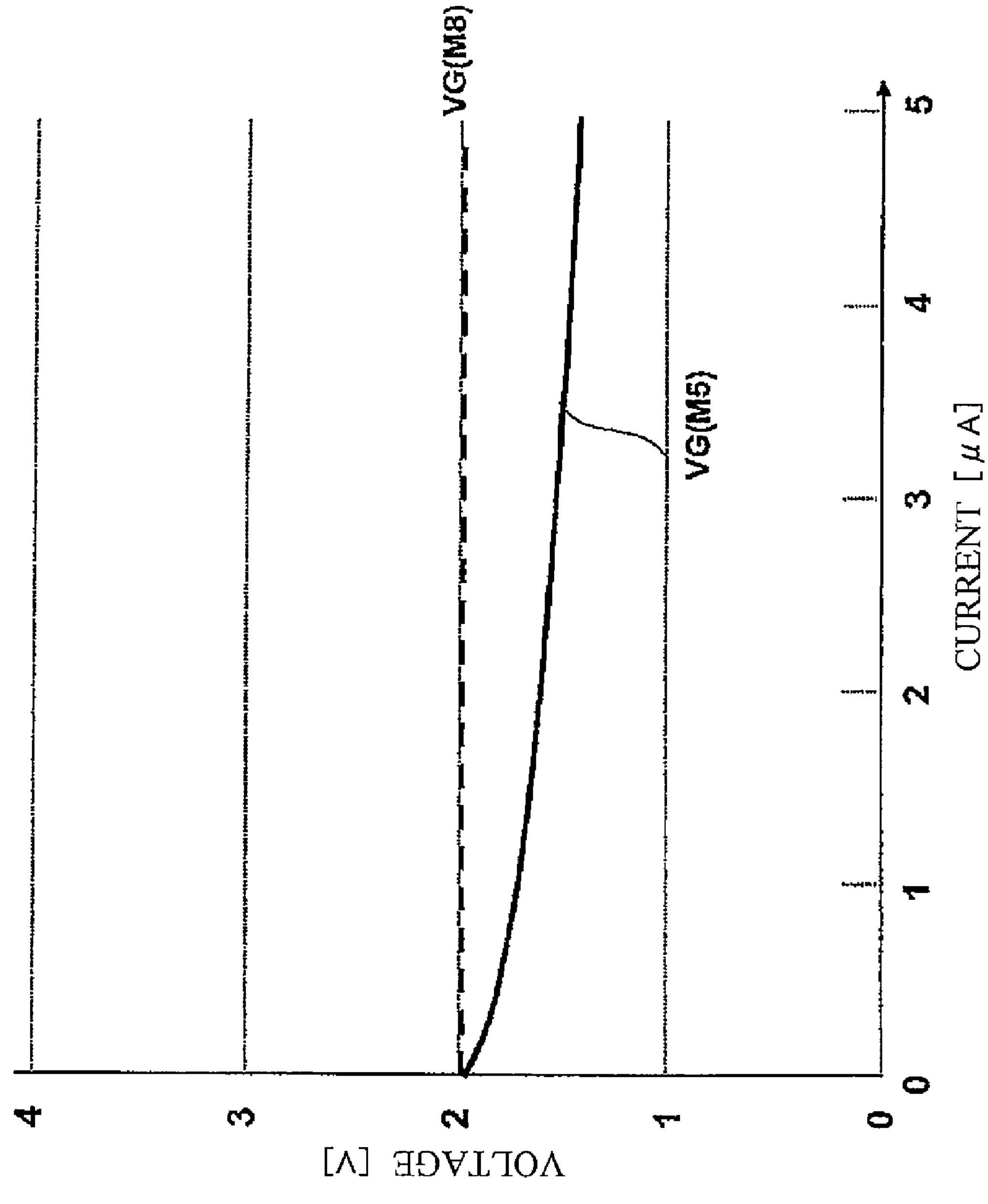
FIG. 3 shows a gate voltage VG (M5) of a transistor M5 when the drain current ISEN is changed in Embodiment 1 of the present invention.

As with the dashed line in FIG. 2, a dashed line in FIG. 3 indicates the characteristics of the gate voltage VG (M8) of the transistor M8, which is always "2 V" regardless of changes in the current value of the drain current ISEN. A solid line in FIG. 3 indicates characteristics of the gate voltage VG (M5) of the transistor M5 in accordance with changes in the drain current ISEN, which is changed by using Equation 13.

Assume here that "K8" of the transistor M8 and "K5" of the transistor M5 are equal to each other, and the source current I8 of the transistor M8 and the source current I5 of the transistor M5 are equal to each other owing to the current mirror 76 formed by the transistor M9 and the transistor M6. In this case, the gate-source voltage VGS (M8) of the transistor M8 and the gate-source voltage VGS (M5) of the transistor M5 are equal to each other. Therefore, the gate voltage VG (M8) of the transistor M8 and the gate voltage VG (M5) of the transistor M5 are supposed to be equal to each other.

However, since settings of "K8=8, K5=2" are made as in Equation 11, the gate voltage VG (M8) of the transistor M8 and the gate voltage VG (M5) of the transistor M5 do not become equal to each other. That is, as indicated by the solid line in FIG. 3, in accordance with Equation 13, the gate voltage VG (M5) of the transistor M5 decreases as the drain current ISEN increases. When the term "$\sqrt{ISEN}\times(-1/4)$" in Equation 13 is compared to the term "$\sqrt{ISEN}\times(1/4)$" in Equation 12, the coefficient that multiplies $\sqrt{ISEN}$ in Equation 13 is a negative number and the coefficient that multiplies $\sqrt{ISEN}$ in Equation 12 is a positive number, but the absolute values of these coefficients are the same. Accordingly, the decreasing rate in Equation 13 is symmetrical with the increasing rate in Equation 12.

Figure 4:
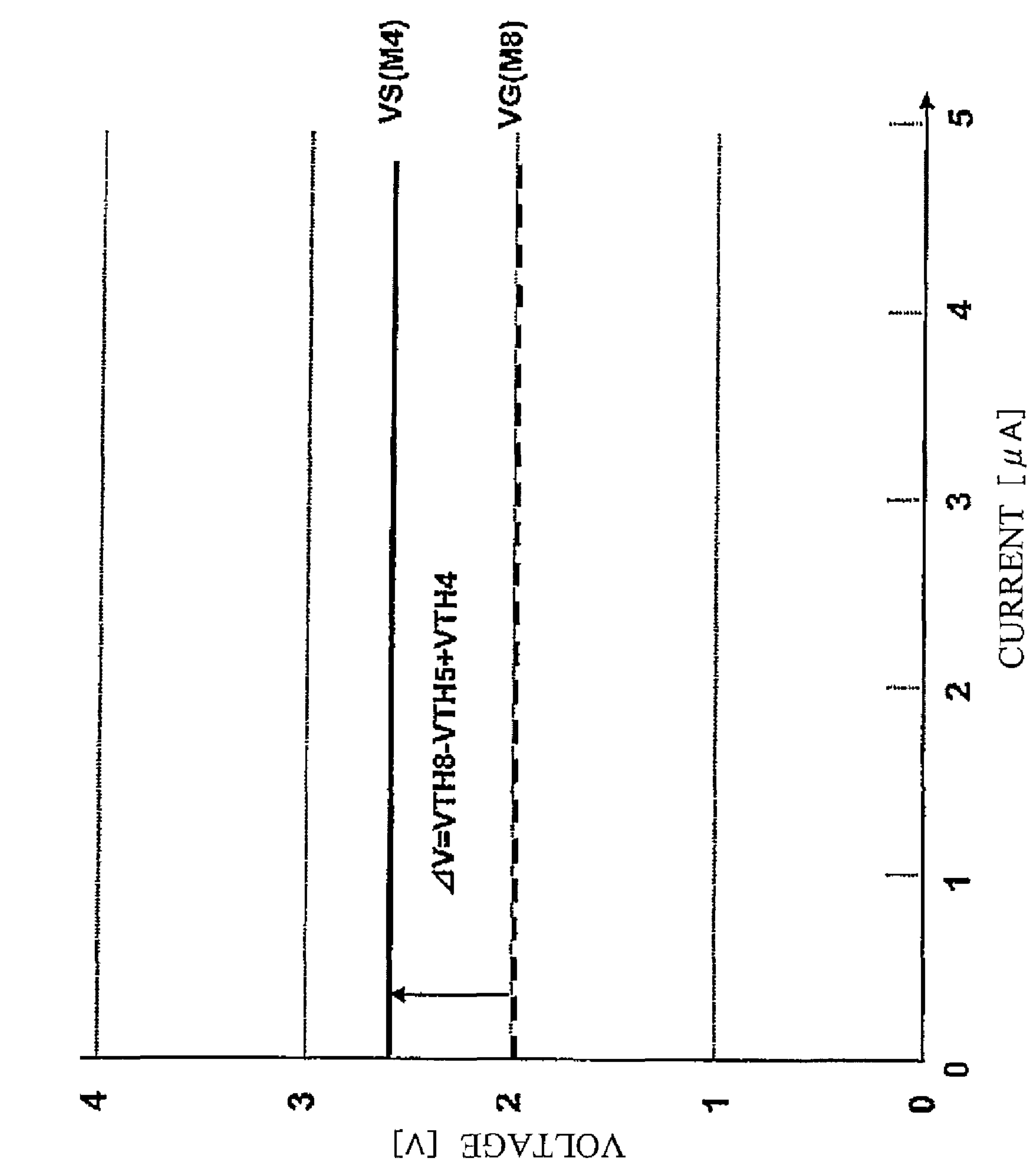
FIG. 4 shows a source voltage VS (M4) of a transistor M4 when ISEN is changed in Embodiment 1 of the present invention.

As with the dashed line in FIG. 2, a dashed line in FIG. 4 indicates the characteristics of the gate voltage VG (M8) of the transistor M8, which is always 2 V regardless of changes in the current value of the drain current ISEN. Meanwhile, a solid line in FIG. 4 indicates characteristics of the source voltage VS (M4) of the transistor M4 in Equation 14. It is understood that, regardless of changes in the drain current ISEN, the source voltage VS (M4) of the transistor M4 indicates a constant value, and is a voltage shifted from the gate voltage VG (M8) of the transistor M8 by "VTH8−VTH5+VTH4=0.6 [V]".

Figure 5:
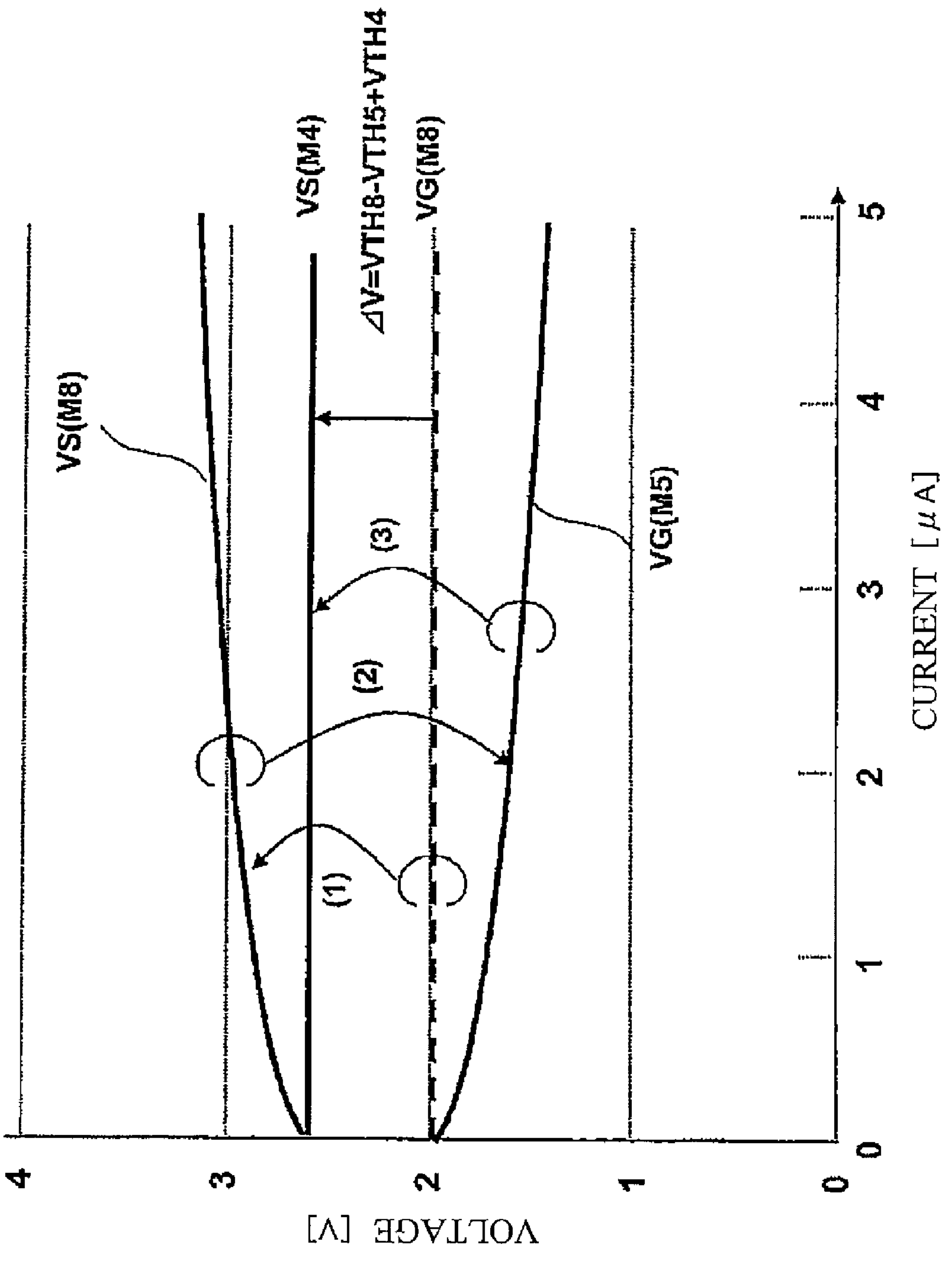
FIG. 5 shows the source voltage VS (M8) of the transistor M8, the gate voltage VG (M5) of the transistor M5, and the source voltage VS (M4) of the transistor M4 when ISEN is changed in Embodiment 1 of the present invention.

FIG. 5 collectively shows the characteristics shown in FIG. 2, FIG. 3, and FIG. 4. In FIG. 5, a change denoted as (1) indicates a transition in which the source voltage VS (M8) of the transistor M8 is determined based on the gate voltage VG (M8) of the transistor M8. Further, in FIG. 5, a change denoted as (2) indicates a transition in which the gate voltage VG (M5) of the transistor M5 is determined based on the source voltage VS (M8) of the transistor M8. Still further, in FIG. 5, a change denoted as (3) indicates a transition in which the source voltage VS (M4) of the transistor M4 is determined based on the gate voltage VG (M5) of the transistor M5.

As is understood from FIG. 5, with reference to the gate voltage VG (M8) of the transistor M8, the source voltage VS (M8) of the transistor M8 increases in accordance with an increase in the drain current ISEN. In contrast, the gate voltage VG (M5) of the transistor M5 decreases in accordance with an increase in the drain current ISEN. As a result, the source voltage VS (M4) of the transistor M4, which is determined based on the gate voltage VG (M5) of the transistor M5, is constant and does not change regardless of an increase in the drain current ISEN. Accordingly, even in a case where the drain current ISEN changes, the source voltage VS (M4) of the transistor M4 is constant as a voltage that is shifted from the gate voltage VG (M8) of the transistor M8 by ΔV represented by an equation shown below.

$$\Delta V=VTH8-VTH5+VTH4=0.6[V] \quad \text{(Equation 15)}$$

The drain voltage VOUT of the output transistor M11 is equal to a voltage that is higher than the gate voltage VG (M8) of the transistor M8 by the gate-source voltage VGS (M10) of the transistor M10. Therefore, if the gate-source voltage VGS (M10) of the transistor M10 is 0.6 V, which is the same as ΔV, then the source voltage VS (M4) of the transistor M4 is represented by an equation shown below.

$$\begin{aligned} VS(M4) &= VOUT - VGS(M10) + \Delta V \\ &= VOUT \end{aligned} \quad \text{(Equation 16)}$$

Here, since the source voltage VS (M4) of the transistor M4 and the drain voltage VD (M3) of the first sense transistor M3 are equal to each other, it is understood that the drain voltage VD (M3) of the first sense transistor M3 and the drain voltage VOUT of the output transistor M11 are equal to each other. In other words, the operating state of the first sense transistor M3 and the operating state of the output transistor M11 are the same, which makes it possible to improve the accuracy of the overcurrent protection.

It should be noted that since the value of the constant current source CS1 can be set to a small value by performing the aforementioned adjustment, the influence of the protective resistor 6, or the influence of interconnect resistance between the output terminal OUT and the source terminal of the transistor M10, the interconnect resistance replacing the protective resistor 6, can be reduced. Accordingly, in a layout on a semiconductor chip, freedom in the arrangement of the output transistor M11, the output terminal OUT, and the overcurrent protection circuit 4 is increased compared to conventional configurations.

Since the value of a current flowing from the drain terminal of the output transistor M11 into the input terminal 71 of the voltage level adjusting circuit 7 is set by the constant current source CS1, the value of the current is constant regardless of changes in a load current. Therefore, at the time of setting the resistance value of the protective resistor 6, it is not necessary to take account of changes in the current flowing into the input terminal 71 of the voltage level adjusting circuit 7.

Further, by setting the value of the constant current source CS1 to a small value, the resistance value of the protective resistor 6 can be set to a large value. This makes it possible to improve internal circuit protection effects compared to conventional configurations.

As one combination example of K8, K5, and K4 that allows the condition of Equation 10 to hold true, the settings of K8=8, K5=2, K4=16 are made as shown in Equation 11. Here, based on Equation 2, K8, K5, and K4 are represented as shown below.

$$K8=(1/2)\times\mu S\times COX\times(W8/L8)$$

$$K5=(1/2)\times\mu S\times COX\times(W5/L5)$$

$$K4=(1/2)\times\mu S\times COX\times(W4/L4) \quad \text{(Equation 17)}$$

It is understood from Equation 17 that the gate width W/gate length L ratios of the respective transistors M8, M5, and M4 corresponding to K8, K5, and K4, i.e., the aspect ratios of (W8/L8):(W5/L5):(W4/L4), are K8:K5:K4 (=8:2:16). That is, the aspect ratio of the transistor M5 is set to be less than the aspect ratio of the transistor M8 and the aspect ratio of the transistor M4.

As described above, with use of the aspect ratios of the transistors M8, M4, and M5, which are determined by such a combination of K8, K5, and K4 as to allow the condition of Equation 10 to hold true, the source voltage of the output transistor M11 and the source voltage of the first sense transistor M3 become equal to each other regardless of increase or decrease in the drain current. This makes it possible to eliminate the influence of channel length modulation, realize highly accurate overcurrent detection, and set an accurate protective current value.

(Variation of Embodiment 1)

The constant-voltage circuit according to Embodiment 1 shown in FIG. 1 is configured such that the gate size of the first sense transistor M3 and the gate size of the second sense transistor M7 are equal to each other. However, Embodiment 1 is not thus limited. Hereinafter, the operation of the voltage level adjusting circuit 7 in a case where the gate size of the second sense transistor M7 is twice as large as the gate size of the first sense transistor M3 is described. If the drain current of the first sense transistor M3 is "ISEN" and the drain current of the second sense transistor M7 is "2×ISEN", then all of the source current I8 of the transistor M8, the source current I5 of the transistor M5, and the source current I4 of the transistor M4 are "ISEN". Therefore, in this case, Equation 7, Equation 8, and Equation 9 are represented as equations shown below.

$$VS(M8)=VG(M8)+\sqrt{ISEN}\times\sqrt{(1/K8)}+VTH8 \quad \text{(Equation 18)}$$

$$VG(M5)=VG(M8)+\sqrt{ISEN}\times\{\sqrt{(1/K8)}-\sqrt{(1/K5)}\}+VTH8-VTH5 \quad \text{(Equation 19)}$$

$$VS(M4)=VG(M8)+\sqrt{ISEN}\times\{\sqrt{(1/K8)}-\sqrt{(1/K5)}+\sqrt{(1/K4)}\}+VTH8-VTH5+VTH4 \quad \text{(Equation 20)}$$

Assume here that the condition of an equation below holds true in Equation 20.

$$\{\sqrt{(1/K8)}-\sqrt{(1/K5)}+\sqrt{(1/K4)}\}=0 \quad \text{(Equation 21)}$$

One combination example of K8, K5, and K4 that allows the condition of Equation 21 to hold true is as shown below.

$$K8=16, K5=4, K4=16 \quad \text{(Equation 22)}$$

If the above settings in Equation 22 are assigned to Equation 18, Equation 19, and Equation 20, then Equation 18, Equation 19, and Equation 20 are represented as equations shown below.

$$VS(M8)=VG(M8)+\sqrt{ISEN}\times(1/4)+VTH8 \quad \text{(Equation 23)}$$

$$VG(M5)=VG(M8)+\sqrt{ISEN}\times(-1/4)+VTH8-VTH5 \quad \text{(Equation 24)}$$

$$VS(M4)=VG(M8)+VTH8-VTH5+VTH4 \quad \text{(Equation 25)}$$

Similar to Embodiment 1, as shown in Equation 25, the equation representing the source voltage VS (M4) of the transistor M4 does not include terms of the drain current ISEN of the first sense transistor M3 and the drain current ISEN of the second sense transistor M7. Thus, it is understood that the source voltage VS (M4) of the transistor M4 does not depend on the drain current ISEN of the first sense transistor M3 and the drain current ISEN of the second sense transistor M7.

It should be noted that the source voltage VS (M8) of the transistor M8 is represented by Equation 23, which is the same as Equation 12 representing the source voltage VS (M8) of the transistor M8 in Embodiment 1. Also, the gate voltage VG (M5) of the transistor M5 is represented by Equation 24, which is the same as Equation 13 representing the gate voltage VG (M5) of the transistor M5 in Embodiment 1.

Assume here that, in Equation 23, Equation 24, and Equation 25, the gate voltage VG (M8) of the transistor M8 is 2 [V]; the threshold voltage VTH8 of the transistor M8 is 0.6 [V]; the threshold voltage VTH5 of the transistor M5 is 0.6 [V]; and the threshold voltage VTH4 of the transistor M4 is 0.6 [V]. In this case, as with Embodiment 1, the source voltage VS (M8) of the transistor M8 changes as shown in FIG. 2; the gate voltage VG (M5) of the transistor M5 changes as shown in FIG. 3; and the source voltage VS (M4) of the transistor M4 changes as shown in FIG. 4.

It should be noted that even in a case where the values of K8, K5, and K4 are different from those in Embodiment 1, it is clearly understood that the voltage level adjusting circuit 7 operates in the same manner as in Embodiment 1 if the condition of Equation 21 holds true.

As shown in Equation 22, one combination example of K8, K5, and K4 that allows the condition of Equation 21 to hold true is "K8=16, K5=4, K4=16". Here, the gate width W/gate length L ratios of the respective transistors M8, M5, and M4 corresponding to K8, K5, and K4, i.e., the aspect ratios of (W8/L8):(W5/L5):(W4/L4), are K8:K5:K4 (=16:4:16).

As with Embodiment 1, the aspect ratio of the transistor M5 is less than the aspect ratio of the transistor M8 and the aspect ratio of the transistor M4. As described above, the source voltage VS (M11) of the output transistor M11 and the source voltage VS (M3) of the first sense transistor M3 are equal to each other regardless of increase or decrease in the drain current ISEN. This makes it possible to eliminate the influence of channel length modulation of MOS transistors, realize highly accurate current detection, and set an accurate protective current value.

Embodiment 2

Figure 6:
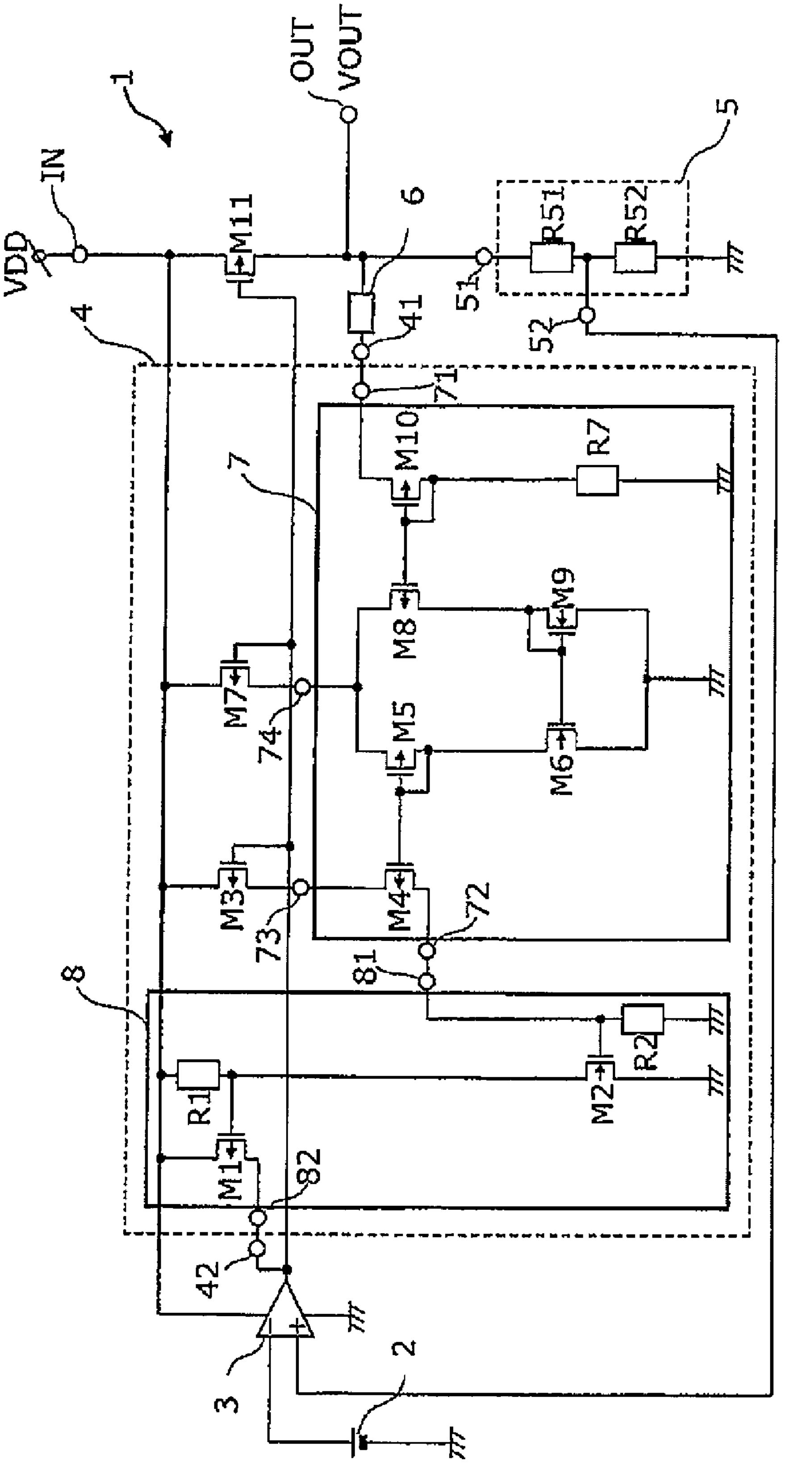
FIG. 6 is a circuit diagram showing the configuration of a constant-voltage circuit according to Embodiment 2 of the present invention.
Figure 7:
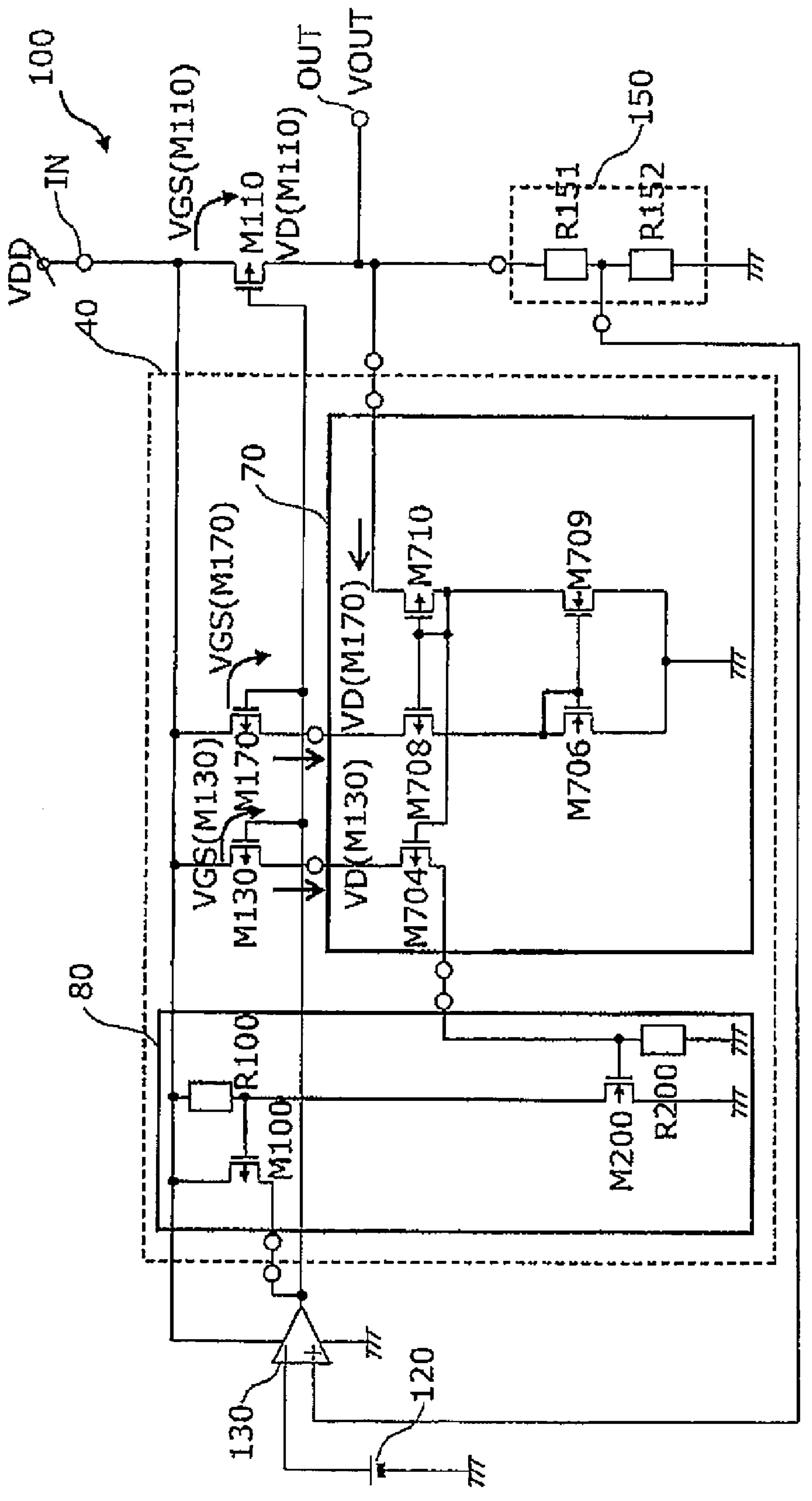
PRIOR ART Fig. 7
FIG. 7 is a circuit diagram showing the configuration of a conventional constant-voltage circuit.

FIG. 6 shows the configuration of a constant-voltage circuit according to Embodiment 2 of the present invention. Embodiment 2 is different from Embodiment 1 of FIG. 1 in that, in Embodiment 2, the constant current source CS1 of the voltage level adjusting circuit 7 is replaced by a resistor R7. The operation of the voltage level adjusting circuit 7 is performed in the same manner as that in Embodiment 1 of FIG. 1. It should be noted that since the terminal voltage at the output terminal OUT is always kept as a desired output voltage VOUT owing to the operation of the error amplifier 3, the voltage of the input terminal 71 is also always kept constant, and a current flowing through the resistor R7 is constant. As a result, the operation is performed in the same manner as that in the case where the constant current source CS1 is used.

Therefore, Embodiment 2 provides the same advantageous effects as those provided in the case where the constant current source CS1 is used as in Embodiment 1 of FIG. 1. In addition, Embodiment 2 makes it possible to simplify the circuit configuration compared to the configuration according to Embodiment 1 of FIG. 1.

The above description of Embodiments 1 and 2 gives examples in which the elements denoted by the reference signs M1 to M11 are MOS transistors. However, these elements are not limited to MOS transistors, but may be bipolar transistors. For example, only the output transistor M11 may be a bipolar transistor, and the other transistors M1 to M10 may be MOS transistors. Alternatively, only the output transistor M11, the first sense transistor M3, and the second sense transistor M7 may be bipolar transistors, and the other transistors M1, M2, M4 to M6, and M8 to M10 may be MOS transistors.

It should be noted that, generally speaking, a term "transistor" refers to a three-terminal signal amplifying element including two "main terminals" and one "control terminal". The "main terminals" are two terminals through which an operating current flows, for example, the source and drain of a field effect transistor, and the emitter and collector of a bipolar transistor. The "control terminal" is a terminal to which a bias voltage is applied, for example, the gate of a field effect transistor and the base of a bipolar transistor.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The present invention is useful to realize a constant-voltage circuit including an overcurrent protection circuit capable of reducing the influence of a protective resistor and interconnect resistance and improving the accuracy of overcurrent protection.

REFERENCE SIGNS LIST

IN input terminal
OUT output terminal
1 constant-voltage circuit
2 reference voltage source
3 error amplifier
4 overcurrent protection circuit
5 voltage divider circuit
6 protective resistor
7 voltage level adjusting circuit
75 voltage generator
76 current mirror
77 voltage level shifter
M1 to M10 transistor
M11 output transistor

What is claimed is:

1. A constant-voltage circuit comprising:

an output transistor including a pair of main terminals connected to input and output terminals of the constant-voltage circuit, respectively, the input terminal being a terminal to which an input voltage is applied, the output terminal being a terminal from which an output voltage is obtained;

an error amplifier configured to apply, to a control terminal of the output transistor, a control voltage corresponding to an error between a voltage corresponding to the output voltage of the output terminal and a reference voltage; and an overcurrent protection circuit configured to cause the output transistor to be in a non-conductive state when the overcurrent protection circuit has detected that an output current from the output transistor is an overcurrent, wherein the overcurrent protection circuit includes:

a first sense transistor, a first terminal of which is connected to the input terminal and a control terminal of which is connected to the control terminal of the output transistor;

a second sense transistor, a first main terminal of which is connected to the input terminal and a control terminal of which is connected to an output terminal of the error amplifier;

a voltage level adjusting circuit configured to adjust a voltage of a second main terminal of the first sense transistor;

a protection circuit configured to control the control voltage applied from the error amplifier to the control terminal of the output transistor, the protection circuit controlling the control voltage in accordance with a current generated by the first sense transistor, the voltage level adjusting circuit includes:

a first transistor, a first main terminal of which is connected to the main terminal of the output transistor at the output terminal side and another main terminal and a control terminal of which are shorted to each other;

a current source element connected to the second main terminal of the first transistor;

a second transistor, a first main terminal of which is connected to a second main terminal of the second sense transistor and a control terminal of which is connected to the control terminal of the first transistor;

a third transistor, a first main terminal of which is connected to the second main terminal of the second sense transistor and another main terminal and a control terminal of which are shorted to each other;

a current mirror circuit configured such that a current flowing out of a second main terminal of the second transistor is an input current to the current mirror circuit, and a current flowing out of the second main terminal of the third transistor becomes a duplicate current, which is a duplicate of the input current; and a fourth transistor, a first main terminal of which is connected to the second main terminal of the first sense transistor, another main terminal of which is connected to an input terminal of the protection circuit, and a control terminal of which is connected to the control terminal of the third transistor.

2. The constant-voltage circuit according to claim 1, wherein an aspect ratio of the third transistor is set to be less than each of an aspect ratio of the second transistor and an aspect ratio of the fourth transistor.

3. The constant-voltage circuit according to claim 1, wherein the current source element of the voltage level adjusting circuit is either a constant current source or a resistor.

4. The constant-voltage circuit according to claim 1, wherein the protection circuit includes:

a first current/voltage converter configured to convert the current generated by the first sense transistor into a first voltage;

a first switch whose conduction is controlled in accordance with the first voltage such that a current corresponding to the first voltage flows through the first switch;

a second current/voltage converter configured to convert the current flowing through the first switch into a second voltage; and a second switch interposed between the input terminal and the control terminal of the output transistor, the second switch being configured such that conduction between the input terminal and the control terminal of the output transistor is controlled in accordance with the second voltage.

* * * * *